July 1, 1969  E. R. FORSMAN  3,452,961
DISC VALVE OPERATOR WITH COMPOUND DRIVING LINKAGE
Filed May 2, 1966  Sheet 1 of 2
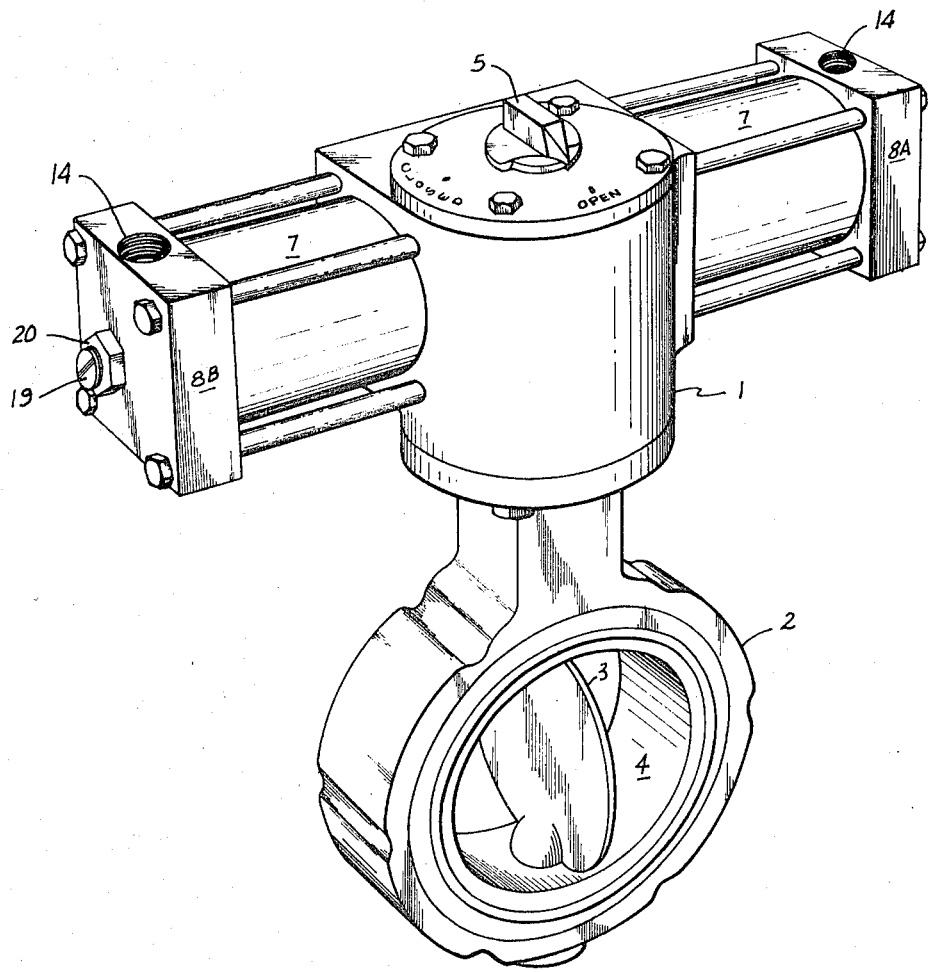
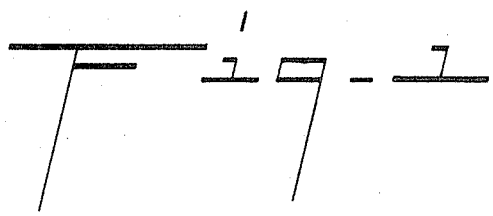
EARL R. FORSMAN
INVENTOR.
BY Browning, Simmons,
Flyer & Eickenroht
ATTORNEYS

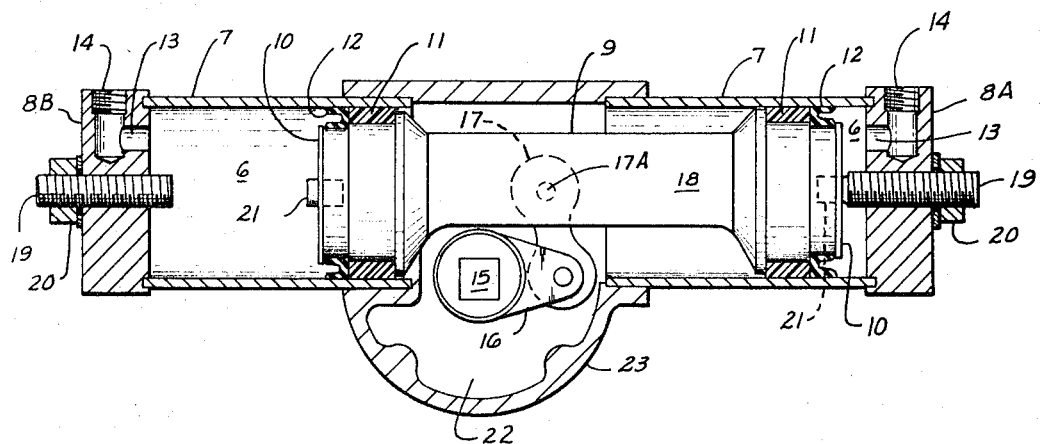
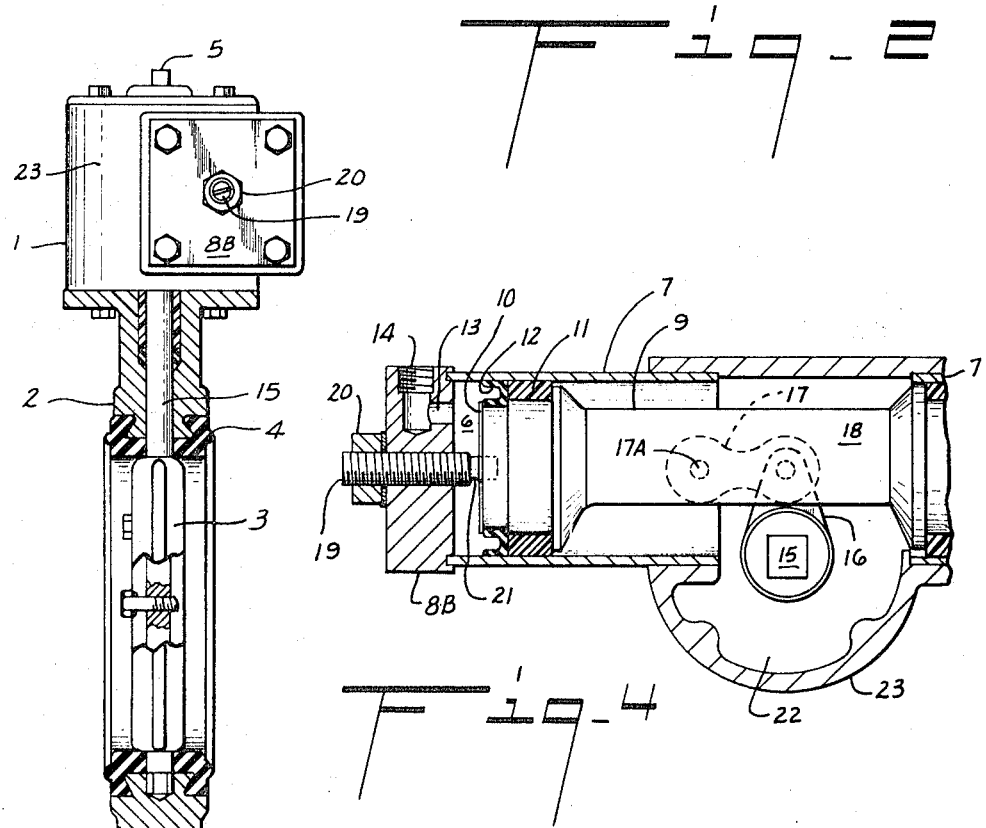

United States Patent Office 3,452,961
Patented July 1, 1969

3,452,961
DISC VALVE OPERATOR WITH COMPOUND
DRIVING LINKAGE
Earl R. Forsman, Houston, Tex., assignor to Keystone
Valve Corporation, Houston, Tex.
Filed May 2, 1966, Ser. No. 546,750
Int. Cl. F16k 1/22, 31/52, 31/12
U.S. Cl. 251—31                                      3 Claims

ABSTRACT OF THE DISCLOSURE

A valve operator for rotating a disc valve through 90° from a closed position to a fully open position is disclosed which provides maximum torque at the closed position, and lesser torque, but rapid rotation as the disc moves toward and away from the fully open position. The operator includes a fluid actuated motor including aligned piston cylinders and a double ended piston reciprocating in the cylinders. A connecting rod connects the piston ends and the rod moves along a straight line path spaced laterally from and perpendicular to the longitudinal axis of rotation of the stem of the valve. A compound driving linkage connects the valve stem and connecting rod and includes a lever arm rigidly connected to the valve stem and a link pivotally connected to the valve stem and the connecting rod. The distance between the longitudinal axis of the valve stem and the pivot point of the lever arm and link, and the distance from this pivot point and the pivot point of the link and the connecting rod is substantially equal to the shortest distance between the longitudinal axis of the stem and the straight line path. Thus, with this connection, the lever arm may be substantially parallel to the straight line path and the link substantially perpendicular thereto when the valve is closed, and the lever arm substantially perpendicular and the link substantially parallel and along said path when the valve is open so that an infinite mechanical advantage may be obtained when the valve is closed, and a mechanical advantage of 1:1 is obtained when the valve is fully open.

---

This invention relates to an actuating mechanism for rotating a device from a first position to a second position where the device has characteristics such that high torque is required for rotation at and near one of said positions and high velocity is desired for rotation at and approaching the other position. In one of its aspects, this invention relates to an actuating mechanism for rotating a valve from an open to closed position and vice versa wherein the valve requires high torque for rotation at and near one of its positions and high velocity is desired for rotation at and approaching the other position. In a further aspect of this invention, it relates to an actuating mechanism for operating a disc or a butterfly valve, having characteristics of the valve described above, from an open to a closed, and from a closed to an open position.

Generally disc valves and the like are rotated through 90° from an open to closed position or vice versa. In order to insure quick and sure operation of these valves, power operated actuating mechanisms or valve operators of some sophistication have been developed to open and close these valves. Generally the power is supplied by a motor or pneumatically operated piston. All the actuating mechanisms heretofore developed, however, although providing a substantial improvement over manual operation of the valves, are not entirely adequate for sure and quick operation of such a valve. This is because disc valves and the like have the characteristics of requiring high torque for rotation when at or near their closed or seated positions whereas such high torque is not required and high velocities are desirable for rotation when the valves are at or approaching their open positions. Thus, as the valve seats against a sealing member as it is closed, or is being unseated when it is open, at an instant when substantial friction inherent in a tight seal must be overcome, it is necessary to provide an actuating mechanism which provides high torque at this position. Also, a disc valve that has been closed a good while may tend to become stuck in this position and require an even higher torque for starting it toward its open position. On the other hand, as the valve approaches its open position or moves from its open position, resistance is low and such a high torque is not required for rotation, but high velocity is desired to insure quick operation of the valve. Generally that portion of the rotation in which high velocity may be employed is substantially larger than the rotation requiring high torque and the ability to provide high speeds during this period is important in providing quick operation of a valve. Such quick operation is important in many emergency situations in high pressure systems.

Although prior devices have been employed as valve operators which provide different torques at different positions of rotation, none of these devices provides the combination of varying torque and velocity at various positions desirable for operation of a disc valve. For example, in one prior device the high torque required for opening and closing a disc valve is provided by use of a compound linkage having a position of high mechanical advantage in a desired position but in combination with a motor driven worm screw to drive the linkage through 90°. The velocity at which the valve is rotated by such device, however, remains unchanged even during rotation through the portion of low resistance and the desired quick operation of the valve is not accomplished. On the other hand, as illustrated by United States Letters Patent 3,104,592 issued to J. M. Sheesley on Sept. 24, 1963, pressure operated motors capable of providing the necessary variation in velocities have been used as valve operators, but not with mechanical linkages having the high mechanical advantages of the compound linkage or with other linkages employed in a manner to provide sufficient torque capabilities at the position of greatest requirement.

The actuating mechanism of this invention contemplates, for rotation of disc valves or similar devices, a combination heretofore not known of a fluid pressure operated piston actuator which will automatically vary in speed inversely with resistance to its operation and a mechanical linking means including a compound linkage having at the desired position substantially greater mechanical advantage than at other positions. This mechanism combines features of operation of both the piston actuator and compound linkage to provide the proper rotational forces and velocities at the proper point in rotation of a disc valve or the like.

It is an object of this invention to provide an actuating mechanism supplying the proper rotational forces and velocities for rotating a valve or like device to or from a closed position to or from an open position wherein high torque for rotation of the valve to or from its closed position is required and high velocity for rotation to or from its open position is desired.

It is a further object of this invention to provide such a mechanism for actuating a disc valve by providing high torque for rotation of the valve to and from its seated position where such high torque is required and high velocity for rotation of the valve to and from its unseated open position where such high velocity is required for most desirable operation of the valve.

Other objects and advantages of this invention will become apparent during the course of the following description and with reference to the accompanying drawings illustrating for the purpose of illustration and example only a preferred embodiment of this invention, and not by way of limitation, and in which:

FIGURE 1 is a perspective view of an actuating mechanism embodying this invention in combination with a disc valve to be operated;

FIGURE 2 is a top sectional view in elevation of the actuating mechanism of FIG. 1 showing in high torque delivering position a dual piston operator in combination with a compound linkage;

FIGURE 3 is a side view in elevation of the same actuating mechanism in combination with a disc valve and in which the disc valve is shown in section in closed position; and FIGURE 4 is a partial top sectional view in elevation of the actuating mechanism similar to FIG. 2, but showing in high velocity delivering position the dual piston operator in combination with the compound linkage.

In accordance with this invention an actuating mechanism is provided which employs the combination of a fluid pressure operated motor capable of varying speed depending on the resistance to its operation and a mechanical linking means including a compound linkage having one position of sufficient mechanical advantage to provide the necessary torques and other positions of lower mechanical advantage in which it is more capable of delivering high velocities to rotate a device connected thereto. The connected device, (shown as a butterfly valve), is rotated from a first position to a second position and has the characteristics of requiring high torque for rotation at and near one of its positions and no high torque, but high velocity for rotation to and from its other position. A reciprocating part such as a double-ended piston is disposed in a pressure chamber and reciprocates longitudinally along a path in the chamber in response to fluid pressure introduced therein. The mechanical linking means is connected between the piston and the device to be rotated and drives the device in a rotary direction about its axis in response to the reciprocation of the piston. The linking means is also connected so that it is substantially at its position of maximum mechanical advantage when the device being rotated is at its position requiring high torque. As the device is rotated toward or away from its other position the velocity of rotation is increased due to the lower resistance against movement of the piston in response to the fluid pressure. As the device moves to and from this position of no high torque requirement the mechanical linking means is in position of lesser mechanical advantage and is preferably at its position of minimum mechanical advantage as the device reaches said other position.

The combined movement of the piston and mechanical linking means should be an amount to cause rotation of the device from its first position to its second position or vice versa. Stops may be provided in the pressure chamber which are preferably adjustable for limiting the movement of the piston to a predetermined amount.

In a preferred form of this invention, as illustrated in the drawings and described below, the actuating mechanism is used in combination with a disc valve rotated through 90° from either its open or closed position to the other. The disc valve has the characteristics of requiring high torque to overcome friction encountered as it is closed or seated on or against a sealing member. As the valve approaches its open position, less resistance is encountered and high torque is not required to rotate the valve. High velocity is desired, however, for rotation of the valve through its positions of low resistance. As further illustrated in the detail description to follow the actuating mechanism of this invention is particularly useful in combination with such a valve.

Referring to the drawings wherein like numerals are employed to designate like parts throughout, in FIG. 1, the valve actuating mechanism 1 is shown in combination with a disc valve 2. The disc valve 2, shown in its open position in this figure, is closed by rotating the disc 3 through 90° to a position where it seats on a seating member 4 and is substantially perpendicular to the seating surface of the member 4. The valve disc 3 is connected to the actuating mechanism 1 and is rotated by it to and from its open and closed positions. A pointer knob 5 may be placed on top of the mechanism 1 and connected to a valve stem to follow its rotation so that an external visible indication is given of the position of the valve disc 3.

Referring to FIG. 2 the actuating mechanism is shown in more detail as a reciprocating fluid pressure actuated motor having a part reciprocating along a path laterally spaced from the axis of rotation of the valve. Pressure chambers 6 are formed by the cylinders 7 and the cylinder heads 8A and 8B. The cylinders extend from opposite sides of a housing 23. The reciprocating part is shown as a piston 9, which in the preferred embodiment shown is a double-ended piston, and has its ends respectively disposed in the pressure chambers 6 to move longitudinally therein along a path. The piston 9 includes ends 10, which may be circular to conform to the shape of the cylinders 7, and a piston rod 18 connecting the ends. Sealing members 11 and 12, which are preferably rings of fluorohydrocarbon polymers such as tetrafluoroethylene or similar materials are placed around the periphery of the piston ends 10 for sealing pressures in the chambers 6. A means is provided in the cylinder heads 8A and 8B for communicating fluid pressures to the chambers 6 to cause the piston 9 to move back and forth in the chambers 6 in response thereto. This means includes the passageways 13 and 14. The passageway 14 may be threaded as it emerges from the cylinder heads 8 to allow connection of a hose or line carrying fluid pressure. Preferably pneumatic pressures are used to operate the piston, but hydraulic or other pressures may be employed if desired.

The disc 3 of the disc valve 2 has a stem 15 projecting up into the chamber 22 formed by the housing 23 of the actuating mechanism 1. Rotation of this stem rotates the disc 3 connected thereto. The stem is perpendicular to the path of movement of the piston 9 and is spaced laterally from the piston 9. A mechanical linking means is connected between the piston 9 and a stem 15 and connects these members so that the longitudinal movement of the piston 9 causes rotation of the stem 15. In this preferred form this linking means is a compound driving linkage including a crank or lever arm 16 non-rotatably connected at one end to the stem 15, and a link or pitman 17 pivotally connected at one end to the other end of the lever arm 16. The link is pivotally connected at its other end to the piston rod 18 such as by a pin preferably along its longitudinal axis such as at the point 17A. The lever arm 16 and the link 17 may also be pivotally connected as by a pin and the lever arm 16 is non-rotatably connected to the stem 15 as by a square or other non-circular opening in the lever fitted over a square or other non-circular square end on the stem for this purpose. The lever arm 16 is rotated from substantially perpendicular to the path of reciprocation of the piston 9 when the valve is in its open position to substantially parallel to said path when the valve is in its closed position. At the same time the link 17 is rotated from substantially parallel to and along the path of reciprocation of the piston 9 when the valve is in its open position to substantially perpendicular to said path when the valve is in its closed position. In the preferred arrangement of this linkage, as understood by those skilled in the art, when the lever arm 16 is parallel to the path of reciprocation of the piston 9 and the link 17 perpendicular thereto, the compound linkage is in a position of infinite mechanical advantage. As the linkage moves from this position it moves to a position of lesser mechanical advantage and in the preferred arrangement illustrated, a mechanical advantage of 1:1 is realized when the lever arm 16 is perpendicular to the path of reciprocation and the link 17 is parallel to and along said path. As described in more detail below the valve is connected by the linkage to the piston 9 so as to be substantially at its position of high torque when the linkage is at its position of infinite mechanical advantage and substantially at its position of desired high velocity when the linkage is at its position of a mechanical advantage of 1:1.

In the preferred embodiment shown in FIG. 2 the valve 2 is in its closed position and the lever arm and link combination is shown close to a position of infinite mechanical advantage which is generally a position of slightly less than infinite, although still great, mechanical advantage. In this position the piston 9 has one of its ends abutted against a stop 19 at the cylinder 8A end of the chamber 6. As fluid pressure is introduced into the pressure chamber 6 through the passageways 14 and 13, the piston 9 is caused to move to the other end of the chamber 6 and the other end 10 of the piston 9 abuts against another stop 19 at the cylinder head 8B end of the cylinder 7. In so moving, the piston 9 carries the link 17 at the point 17A along the longitudinal axis. The lever arm 16 is thus caused to pivot about the stem 15 and causing rotation of the valve stem 15 about its axis. As this occurs the valve disc 3 is unseated by a high torque developed by the combination of the moving piston 9 and the compound linkage being at its position of infinite or substantially great mechanical advantage. This high torque is required to seat or unseat a disc valve as such a valve overcomes the high friction of interference, necessary to form a seat against the seating member in which it seats. Many times the disc 3 tends to become stuck within the sealing member 4 and requires still higher torque. After the valve disc is unseated resistance against rotation decreases and the torque requirements for rotating the valve are no longer high. As these requirements lessen, the pressures causing the piston to move have less resistance to overcome and the piston 9 increases in velocity in response to fluid pressures as it moves to the other end. At the same time the compound linkages 16 and 17 are approaching their position of lesser mechanical advantage as shown in FIGURE 4 which is at or substantially near the open position of the valve 2. This position corresponds to the stopping of the piston 9 against a stop at the other end of the chamber 6. Fluid pressures may then be introduced to passageways 13 and 14 on the side 8B to cause the piston to move back towards the side 8A and thus move the valve to its closed position. At first the resistance against this movement is small and the piston 9 moves at high velocities while the compound linkages 16 and 17 move from their position of lesser mechanical advantage. As the valve disc 3 approaches its seating position, the linkages 16 and 17 are again at their position or substantially near their position of maximum mechanical advantage and the high torque necessary to seat the disc 3 is provided.

The chambers 6 should be of a length to allow the movement of the piston 9 to cause the operation of the valve 2 from its open to closed positions. Stops may also be provided for limiting the movement of the piston to a predetermined amount sufficient to allow the rotation of a valve from its open to closed positions and vice versa. In the preferred embodiment shown, these stops are adjustable and include the set screws 19 protruding through the cylinder heads 8A and 8B and the lock nuts 20 which may be used to adjust the bolts to the correct depth of penetration into the chamber 6. The surface of the piston ends 10 may be protruded at the point of engagement with the bolts 19, such as by abutments 21 in each end 10. The bolts 19 abut against the brad 21 which absorb the shock from this abutment. The abutments 21 may be made of plastic or similar material which is resilient and will absorb this shock to protect the surface of the piston ends 10.

The invention having been described, what is claimed is:

1. The combination of a disc valve rotatable through approximately 90° from a closed position at which relatively high torque is required for rotation, to a fully open position where high velocity of rotation is desired at or approaching said position, and a fluid operated valve operator for moving the valve between said positions, said combination comprising: a valve housing including one portion having a valve seat and a disc valve disposed therein, and another portion including a valve stem, said valve stem secured to said disc and extending from said disc through and projecting from said another portion to provide a stem projection so that rotation of the stem projection causes rotation of said valve between said positions; an operator housing mounted on said upper portion and including two spaced apart, elongated piston cylinders, each rigidly secured to said valve housing and extending laterally in an opposite direction from the longitudinal axis of said stem to be aligned along a path perpendicular to and spaced apart from said axis; a double ended piston having each end sealably and slidably movable in one of said cylinders and including a connecting rod rigidly connected to said piston ends and movable along said path; means for alternatively injecting fluid under pressure into said cylinders to cause the pistons to reciprocate therein; a lever arm rigidly connected at one end to said stem projection, said arm being substantially perpendicular to said path when said disc valve is open and substantially parallel to said path when said disc valve is closed; a link pivotally connected adjacent one end to said arm adjacent its other end, and said link pivotally connected adjacent its other end to said connecting rod intermediate said piston ends so that said link is substantially parallel and along said path when said disc valve is open, and substantially perpendicular to said path when said disc valve is closed, whereby said arm and link form a compound linkage connected to have a great mechanical advantage when the disc valve is at or near its closed position, and a lesser mechanical advantage when said valve is in its fully closed position.

2. The combination of claim 1 wherein said great mechanical advantage is infinite and said lesser mechanical advantage is 1:1.

3. The combination of claim 1 wherein said fluid pressure is pneumatic pressure.

References Cited

UNITED STATES PATENTS

| 3,204,920 | 9/1965 | Generke | 251—58 |
| 3,317,179 | 5/1967 | Willis | 251—58 |
| 1,724,079 | 8/1929 | Goldberg | 251—52 X |

FOREIGN PATENTS

| 619,964 | 1/1927 | France. |
| 646,042 | 9/1962 | Italy. |

ARNOLD ROSENTHAL, *Primary Examiner.*

U.S. Cl. X.R.

74—105; 92—138; 251—58, 232